R. A. THIEDE.
ASH SIFTER.
APPLICATION FILED NOV. 11, 1920.
1,422,011.
Patented July 4, 1922.
2 SHEETS—SHEET 1.
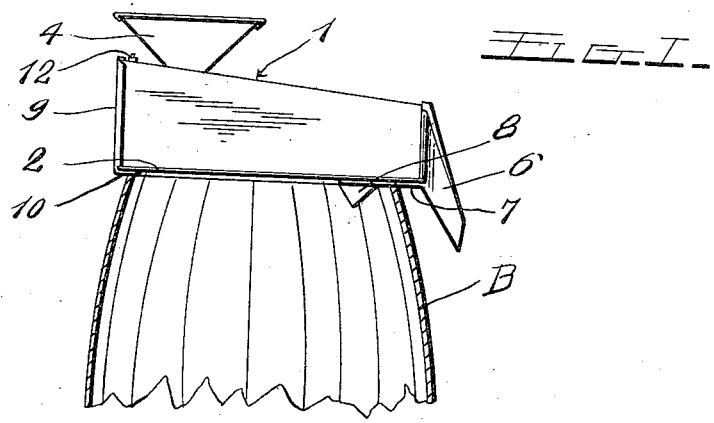
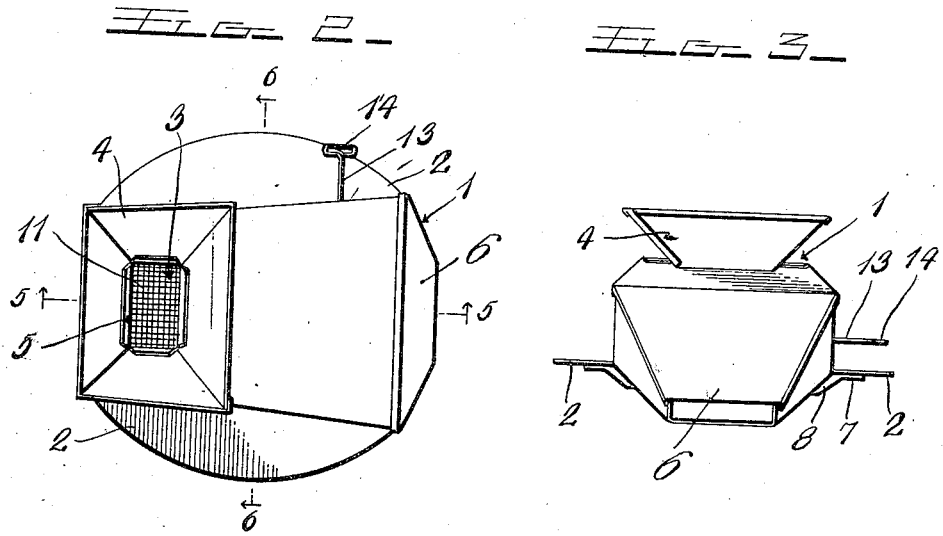
Inventor
Richard A. Thiede
Witness
J. R. Hoge
By H. B. Willson &co
Attorneys

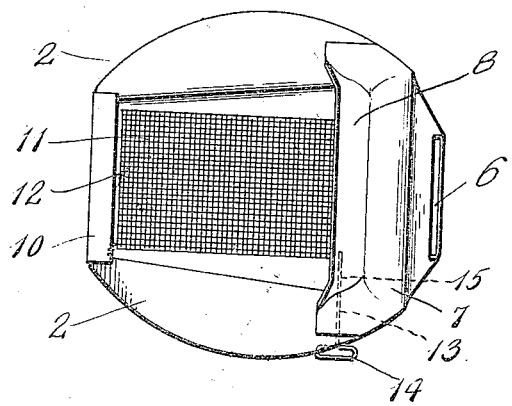
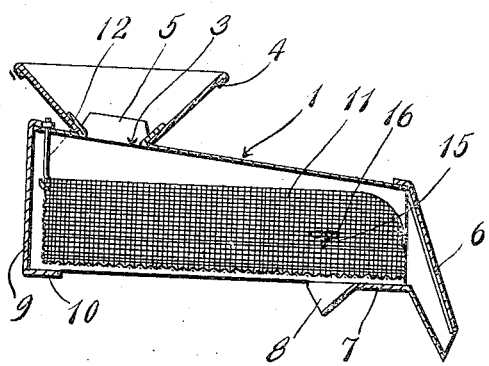
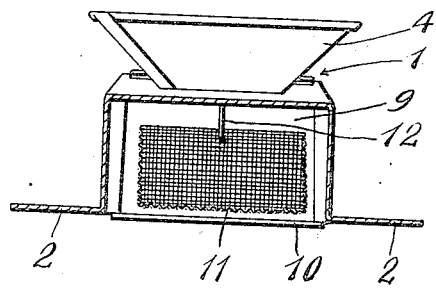

UNITED STATES PATENT OFFICE.

RICHARD A. THIEDE, OF CAMDEN, NEW JERSEY.

ASH SIFTER.

1,422,011. Specification of Letters Patent. Patented July 4, 1922.

Application filed November 11, 1920. Serial No. 423,429.

*To all whom it may concern:*

Be it known that I, RICHARD A. THIEDE, a citizen of the United States, residing at Camden, in the county of Camden and State of New Jersey, have invented certain new and useful Improvements in Ash Sifters; and I do declare the following to be a full, clear, and exact description of the invention, such as will enable others skilled in the art to which it appertains to make and use the same.

This invention relates to improvements in ash sifters of the type which are adapted to be placed on top of a receptacle such as a barrel or the like.

One object of the invention is to generally improve upon devices of this class and to provide one which is simple and durable in construction, easily manipulated, highly efficient in use, and yet inexpensive to manufacture.

Another object of the invention is to provide a sifter which is provided with a downturned discharge spout including a substantially horizontal bottom, the inner end of which is directed downwardly in a direction opposite to that of the spout proper so that it will serve as a deflector to direct the ashes into the barrel and will permit the upper edge of the latter to be positioned between it and the spout proper, thus serving to partially retain the device in position on the barrel.

Other objects and advantages of the invention will be apparent during the course of the following description.

In the accompanying drawings forming a part of this specification and in which like numerals are employed to designate like parts throughout the same:

Figure 1 is a side elevational view of a sifter constructed in accordance with my invention, the same being shown in position on a barrel.

Fig. 2 is a top plan view thereof.

Fig. 3 is an end elevation.

Fig. 4 is a bottom plan view.

Figs. 5 and 6 are sectional views taken on the lines 5—5 and 6—6 respectively of Figure 2.

Referring to the drawings wherein the preferred embodiment of my invention is shown, the letter B designates a barrel, on the upper end of which my improved sifter is positioned. While I have shown the sifter in use in connection with a barrel, I desire it to be understood that it may be equally well used in connection with any other suitable type of receptacle.

My sifter comprises a casing 1 which is preferably of channel formation, the opposite ends of the side walls thereof being directed laterally to provide a pair of supporting flanges 2 designed to rest on the upper edge of the barrel. In the top of the casing and adjacent one end thereof an opening 3 is formed, and secured around this opening is a feed hopper 4 of suitable formation. As shown, this opening 3 is formed by striking the metal up to provide a plurality of tongues 5 to which the hopper is secured in any suitable manner. Closing the forward open end of the casing is a downturned discharge spout 6 which may be integral with the casing or may be secured thereto in any suitable manner. This discharge spout includes a substantially horizontal bottom which extends for a distance along the open bottom of the casing, the inner edge of this bottom 7 being directed downwardly in a direction opposite to that of the spout proper. This downwardly bent end constitutes a deflector 8 by means of which the small particles are directed into the barrel. In addition to this, it also serves to permit the upper edge of the barrel to be positioned between itself and the spout proper and thus serves as a means for partially retaining the device in position on the barrel. The opposite open end of the casing is closed by means of a plate 9 which is secured in position in any suitable manner and has its lower edge directed laterally inward to provide a flange 10 which also rests on the upper edge of the barrel.

The ashes to be sifted are introduced into the casing through the hopper 4 and they drop into the receptacle 11 which is arranged within the casing and is adapted to be moved in order to separate the fine particles from the large particles which are discharged through the discharge spout 6. The referred to receptacle 11 is, by preference, in the form of a wire basket of rectangular form which is open at its forward end to permit the larger particles of the ashes to escape therefrom and pass through the discharge spout. This basket could be mounted in many different ways in the casing; however, I prefer to suspend the rear end in the manner shown so that it may be easily manipulated. Such suspension is obtained by the employment of a hook-bolt 12 which is movably secured to the top of the casing at a point beyond the hopper and depends into the interior of the casing, the central part of rear end of the basket being detachably connected thereto and suspended thereby. For the purpose of actuating the basket 11, I employ a rod 13 provided at its outer end with a handle 14 and at its inner end with a hook 15 which has detachable connection with the front portion of the basket, and this rod extends through an opening 16 formed in one of the side walls of the casing. The basket is moved by simply pushing and pulling the rod 13, as is obvious.

In use, it will be seen that the device will be placed upon the upper end of a barrel or other suitable receptacle into which the smaller particles are to be discharged. When in proper position the ashes to be sifted are introduced into the movable basket in the casing through the feed hopper 4. When a sufficient quantity of material is in the basket, the latter is actuated by simply pulling and pushing the rod 13 toward and from the casing. Such movement of the basket will separate the larger particles from the smaller particles, the latter being deposited in the barrel, while the larger particles will pass out of the discharge spout and into a suitable receptacle which will be placed beneath the latter. In case the larger particles should clog the discharge opening and prevent effective operation of the device, the basket 11 may be readily removed by simply detaching it from the hook-bolt 9 and hook 15 of the actuating member 13. By removing the basket, the device may be cleaned and put in condition for effective operation.

From the foregoing construction it will be seen that I have perfected an extremely simple and effective ash sifter which includes novel means for retaining it in position on the barrel and the construction of which is such that an effective separation of the cinders from the smaller particles will be obtained. The means for suspending the wire basket and operating the latter is such that it permits the basket to be readily removed in order to clean the discharge spout. This is also a feature of construction to be carefully considered. Few and inexpensive parts are employed in the make up of the device, consequently, the cost of manufacture is greatly reduced.

While I have described and shown my ash sifter as being used in connection with a barrel, I desire it to be understood that it may be equally well used in connection with various other types of receptacles. I also wish it to be understood that various minor changes in the shape, size, and arrangement of parts may be resorted to without departing from the spirit of the invention or the scope of the subjoined claim.

A careful consideration of the foregoing description taken in connection with the accompanying drawings will enable persons skilled in the art to which this invention relates to obtain a clear understanding of the same, therefore, further description is deemed unnecessary.

I claim:

An ash sifter comprising a channel-shaped casing having an upper wall and side walls, the lower portions of the side walls being bent laterally to provide supporting flanges for resting upon the open upper end of a receiving receptacle, the upper wall of said casing having an inlet opening, a plate closing the rear end of the casing and having its lower end portion extending beneath the casing for resting upon the receptacle, a down-turned discharge spout closing the forward end of the casing and having an extension extending beneath the casing for resting upon the receptacle, the extension being provided with a deflected lip for extending into the receptacle, and means in the casing for receiving ashes and after sifting the ashes passing resulting cinders through the discharge spout.

In testimony whereof I have hereunto set my hand.

RICHARD A. THIEDE.